United States Patent
Hlavaty et al.

(10) Patent No.: US 8,151,458 B2
(45) Date of Patent: Apr. 10, 2012

(54) NON-METALLIC COVER FOR A FIXTURE

(75) Inventors: Kirk D. Hlavaty, East Hartford, CT (US); Stephen V. Glynn, Cromwell, CT (US); Gordon Miller Reed, Plantsville, CT (US)

(73) Assignee: United Technologies Corporation, Hartford, CT (US)

( * ) Notice: Subject to any disclaimer, the term of this patent is extended or adjusted under 35 U.S.C. 154(b) by 1085 days.

(21) Appl. No.: 12/034,849

(22) Filed: Feb. 21, 2008

(65) Prior Publication Data

US 2009/0211091 A1 Aug. 27, 2009

(51) Int. Cl.
*B23B 37/00* (2006.01)
*B25B 1/24* (2006.01)
*B25B 5/14* (2006.01)

(52) U.S. Cl. ......... 29/889.2; 29/559; 269/285; 269/286; 269/329; 269/240

(58) Field of Classification Search .. 29/889.2–889.722, 29/281.1–284, 559; 269/47, 909; 451/364–384, 451/406–409
See application file for complete search history.

(56) References Cited

U.S. PATENT DOCUMENTS

| | | | | |
|---|---|---|---|---|
| 3,818,646 A * | 6/1974 | Peterson | | 451/365 |
| 4,128,918 A * | 12/1978 | Wenk | | 24/16 R |
| 4,179,774 A * | 12/1979 | Bradbury | | 24/132 R |
| 4,557,024 A * | 12/1985 | Roberts et al. | | 24/20 TT |
| 4,638,602 A | 1/1987 | Cavalieri | | |
| 4,672,727 A * | 6/1987 | Field | | 29/889.721 |
| 4,805,351 A * | 2/1989 | Dobson et al. | | 451/28 |
| 4,829,720 A | 5/1989 | Cavalieri | | |
| 5,081,765 A * | 1/1992 | Fraser et al. | | 29/889.1 |
| 5,168,608 A * | 12/1992 | Fraser et al. | | 29/26 A |
| 5,280,556 A * | 1/1994 | Jones | | 385/139 |
| 5,529,297 A * | 6/1996 | Sawdon | | 269/239 |
| 5,544,873 A * | 8/1996 | Vickers et al. | | 269/47 |
| 5,792,267 A * | 8/1998 | Marszal et al. | | 118/500 |
| 5,927,014 A * | 7/1999 | Goldenberg | | 49/182 |
| 6,139,412 A | 10/2000 | Dwyer | | |
| 6,296,705 B1 | 10/2001 | Ireland et al. | | |
| 6,391,115 B1 | 5/2002 | Marszal et al. | | |
| 6,403,157 B2 | 6/2002 | Ireland et al. | | |
| 6,568,993 B1 * | 5/2003 | Jones et al. | | 451/28 |
| 6,627,833 B2 * | 9/2003 | Varsell et al. | | 219/69.11 |
| 6,640,437 B2 * | 11/2003 | McFarland | | 29/889.22 |
| 6,647,611 B2 * | 11/2003 | Zhang | | 29/559 |
| 6,652,369 B2 * | 11/2003 | Jones et al. | | 451/365 |
| 6,820,468 B2 * | 11/2004 | Powers et al. | | 73/49.7 |
| 6,855,033 B2 * | 2/2005 | Jones et al. | | 451/28 |
| 6,883,224 B2 * | 4/2005 | Thomas | | 29/559 |
| 6,959,572 B2 | 11/2005 | Lawrence et al. | | |
| 6,968,608 B2 * | 11/2005 | Jones et al. | | 29/559 |
| 6,971,925 B1 * | 12/2005 | Orange | | 439/773 |
| 7,118,021 B2 * | 10/2006 | Swartzbeck et al. | | 228/44.3 |
| 7,219,408 B2 * | 5/2007 | Jones et al. | | 29/281.1 |
| 7,328,496 B2 * | 2/2008 | Powers et al. | | 29/559 |

(Continued)

*Primary Examiner* — Derris Banks
*Assistant Examiner* — Kaying Kue
(74) *Attorney, Agent, or Firm* — Carlson, Gaskey & Olds, P.C.

(57) ABSTRACT

An assembly includes a fixture including an opening shaped to receive a portion of a turbine engine component. A non-metallic cover is placed over at least a portion of the fixture. The cover facilitates reducing metal to metal contact of the fixture and the turbine engine component when the turbine engine component is installed in the fixture, and facilitates reducing scratching of the turbine engine component.

25 Claims, 5 Drawing Sheets

U.S. PATENT DOCUMENTS

| | | | |
|---|---|---|---|
| 7,384,078 B2 * | 6/2008 | Cobb et al. | 285/420 |
| 7,762,534 B2 * | 7/2010 | Ouellette et al. | 269/32 |
| 2002/0136637 A1 * | 9/2002 | Powers et al. | 416/219 R |
| 2003/0114080 A1 * | 6/2003 | Jones et al. | 451/28 |
| 2003/0114081 A1 * | 6/2003 | Jones et al. | 451/28 |
| 2003/0114082 A1 * | 6/2003 | Jones et al. | 451/28 |
| 2004/0055134 A1 * | 3/2004 | Jones et al. | 29/464 |
| 2005/0091846 A1 * | 5/2005 | Powers et al. | 29/889.1 |
| 2005/0109816 A1 * | 5/2005 | Swartzbeck et al. | 228/44.3 |
| 2005/0268461 A1 * | 12/2005 | Ouellette et al. | 29/889.7 |
| 2005/0268463 A1 * | 12/2005 | Ouellette et al. | 29/889.21 |
| 2007/0119040 A1 * | 5/2007 | Jones et al. | 29/428 |

* cited by examiner

NON-METALLIC COVER FOR A FIXTURE

BACKGROUND OF THE INVENTION

This application relates to a non-metallic cover that is positioned on a fixture that holds a turbine engine component during a manufacturing process, the cover protecting the turbine engine component from scratches.

Gas turbine engines typically include turbine rotors having a plurality of removable turbine blades and a plurality of static vanes. Before a manufacturing process, a metal turbine blade is installed in a metal fixture. The turbine blade must be accurately aligned with an opening in the fixture to prevent scratching of the turbine blade during installation. The metal to metal contact between the turbine blade and the fixture can scratch the turbine blade. If the manufacturing process is a laser drilling process, laser splatter can collect on the fixture, which can be difficult to remove.

There is a need in the art for a cover that protects a turbine engine component from scratches and that overcomes the other drawbacks and shortcomings of the prior art.

SUMMARY OF THE INVENTION

An assembly includes a fixture including an opening shaped to receive a portion of a turbine engine component. A non-metallic cover is placed over at least a portion of the fixture. The cover facilitates reducing metal to metal contact of the fixture and the turbine engine component during installation of the turbine engine component in the fixture, and facilitates reducing scratching of the turbine engine component.

The turbine engine component can be a turbine blade including a base with a dovetail shape that defines a groove that extends along a length of base. The shape of the opening of the fixture generally corresponds to the shape of the base of the turbine blade. The fixture includes projections on opposing sides of the opening, and the cover includes projections on opposing sides of an opening of the cover. In one example, the projections of the cover taper inwardly. When the cover is placed on the fixture, the projections of the cover generally align with the projections of the fixture.

When the turbine blade is to be installed in the fixture, the base of the turbine blade is aligned with the opening of the fixture. The turbine blade is then slid such that the projections of the cover are received in the grooves of the turbine blade to guide the turbine blade. As the turbine blade continues to move, the projections of the fixture are received in the grooves of the base of the turbine blade and guide the turbine blade until it is installed.

These and other features of the present invention can be best understood from the following specification and drawings, the following of which is a brief description.

DETAILED DESCRIPTION OF THE PREFERRED EMBODIMENT

Figure 1:
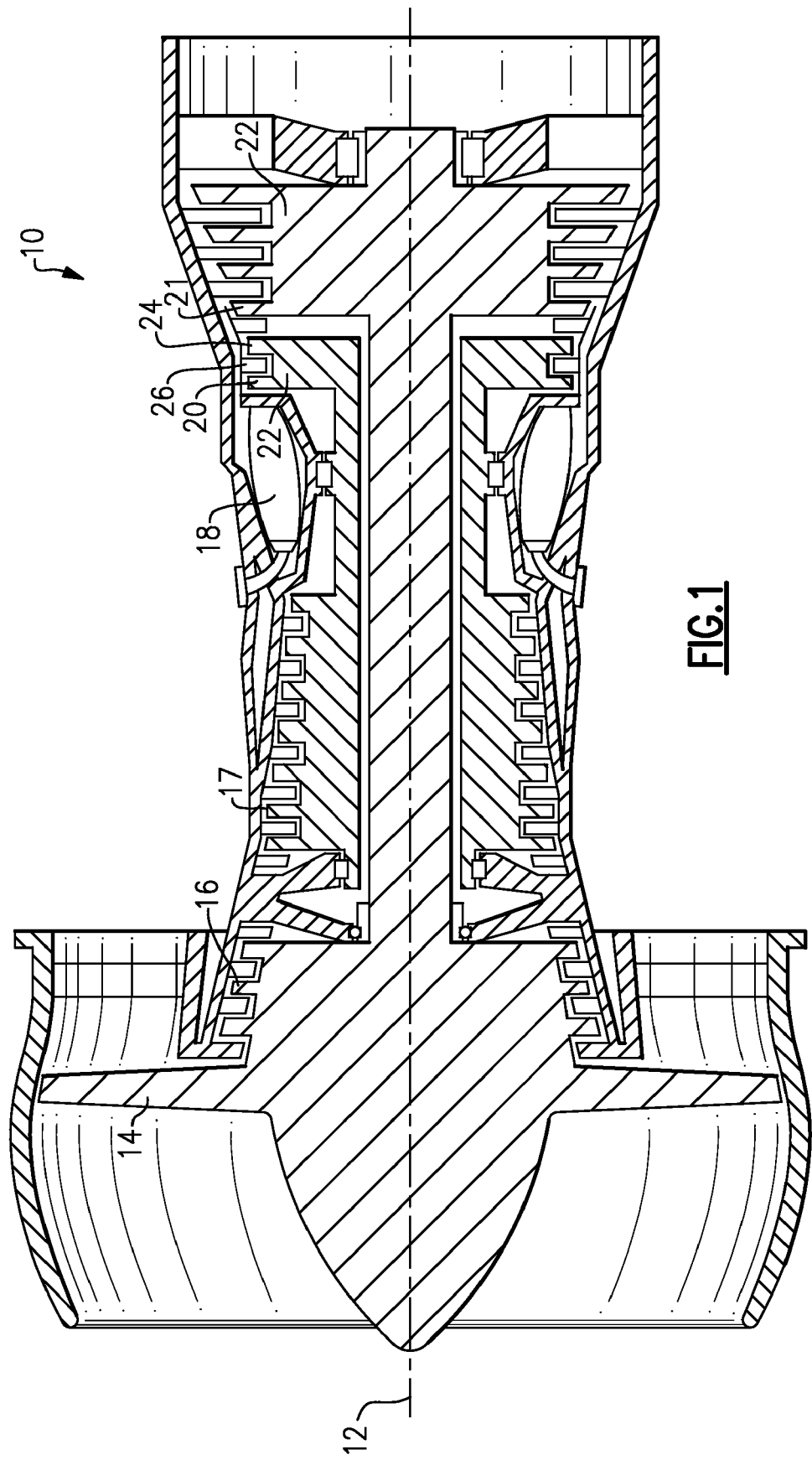
FIG. 1 illustrates a simplified cross-sectional view of a standard gas turbine engine.

A gas turbine engine 10, such as a turbofan gas turbine engine, circumferentially disposed about an engine centerline (or axial centerline axis 12) is schematically shown in FIG. 1. The gas turbine engine 10 includes a fan 14, compressors 16 and 17, a combustion section 18 and turbines 20 and 21. This application extends to engines without a fan, and with more or fewer sections. As is well known in the art, air is compressed in the compressors 16 and 17, mixed with fuel and burned in the combustion section 18, and expanded in turbines 20 and 21. The turbines 20 and 21 include rotors 22 which rotate in response to the expansion, driving the compressors 16 and 17 and the fan 14. The turbines 20 and 21 include alternating rows of rotating airfoils or turbine blades 24 and static airfoils or vanes 26. In FIG. 1, the turbine blades 24 are removable from the rotors 22. It should be understood that this schematic view is included simply to provide a basic understanding of the sections in the gas turbine engine 10 and is not limiting. The exemplary assemblies, covers and methods described herein apply to all types of gas turbine engines for all types of applications.

Figure 2:
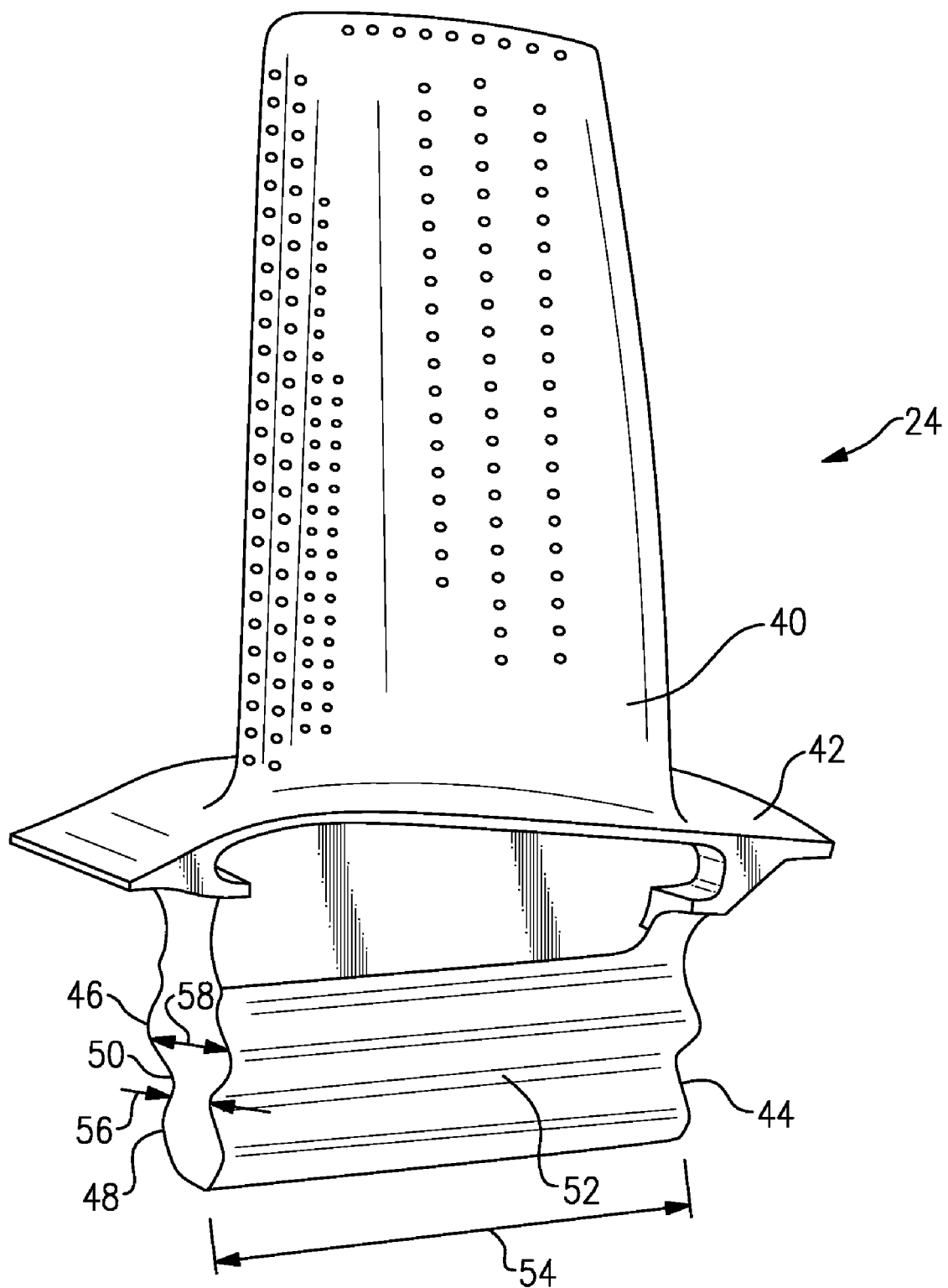
FIG. 2 illustrates a turbine blade as is generally known in the prior art.

FIG. 2 shows a known turbine blade 24. A platform 42 is provided at a radially inner portion of the turbine blade 24, while an airfoil 40 extends radially (as seen from the axial centerline axis 12) outward from the platform 42. A base 44, located under the platform 42, has a dovetail shape including a hill 46 and a valley 50. In one example, there are two hills 46 and 48, and the valley 50 is located between the two hills 46 and 48. The valley 50 defines a groove 52 that extends along a length 54 of the base 44 of the turbine blade 24. The valley 50 has a width 56, and the hills 46 and 48 have a width 58. It should be appreciated to a person of ordinary skill in the art that the base 44 may include various configurations.

Before a manufacturing process, the turbine blade 24 may be installed in a fixture 60 that holds the turbine blade 24 during the manufacturing process. In one example, the manufacturing process can be a laser hole drilling process. In one example, the fixture 60 is a serration fixture. In one example, the fixture 60 is made of metal.

Figure 3:
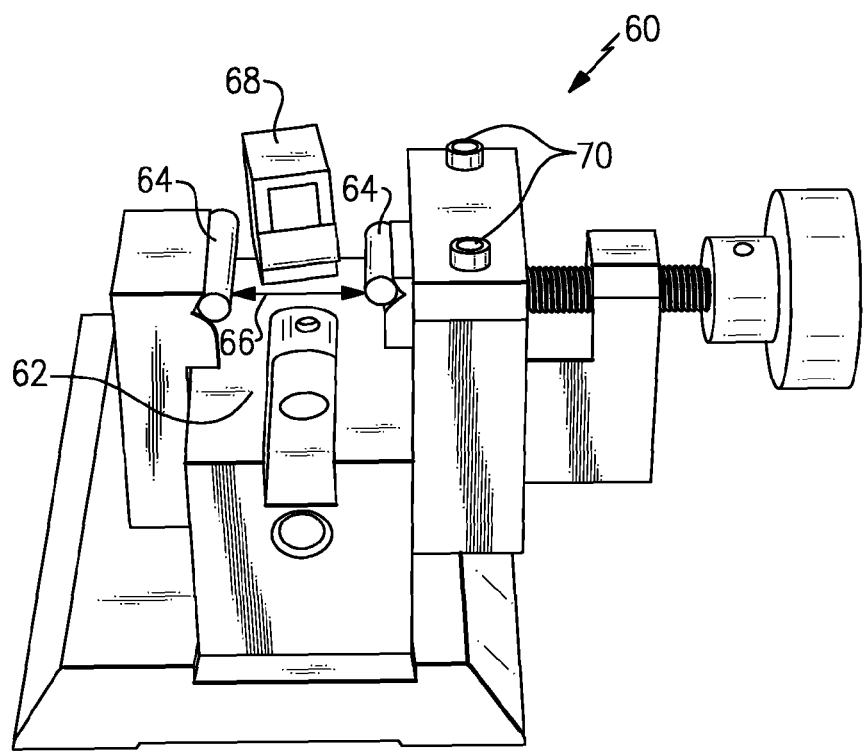
FIG. 3 illustrates a fixture that holds a turbine blade.

As shown in FIG. 3, the fixture 60 includes an opening 62 having a shape that generally corresponds to the shape of the base 44 of the turbine blade 24. The fixture 60 includes an elongated projection 64. In one example, the fixture 60 includes two projections 64, and one of the projections 64 is located on each side of the opening 62. A distance 66 is defined between the projections 64. The fixture 60 also includes a stop 68 and an alignment feature 70. In one example, the alignment feature 70 is a circular head. In another example, the fixture 60 includes two alignment features 70.

Figure 4:
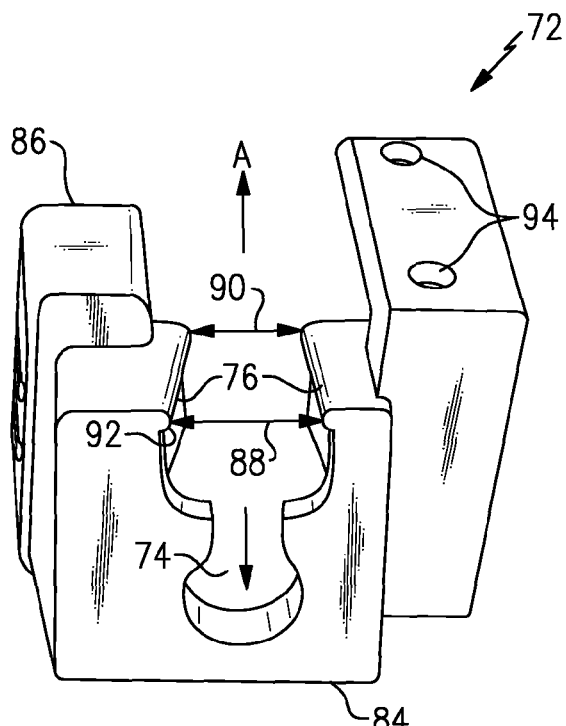
FIG. 4 illustrates a cover that is to be placed on the fixture.

As shown in FIG. 4, a non-metallic cover 72 is placed over at least a portion of the fixture 60. In one example, the cover 72 is placed over a front portion of the fixture 60. In one example, the cover 72 is made of glass filled nylon. The cover 72 includes an opening 74 and an elongated projection 76. In one example, the cover 72 includes two projections 76 that taper inwardly towards a longitudinal axis A of the opening 74 as the projections 76 extend from a front side 84 to a rear side 86 of the cover 72, and one of the projections 76 is located on each side of the opening 74. A distance 88 between the projections 76 is located near the front side 84 of the cover 72 and is greater than a distance 90 between the projections 76 located near the rear side 86 of the cover 72. That is, the distance between the projections 76 is not constant. A flattened portion 92 is located under each of the projections 76, and each of the flattened portions 92 also taper inwardly towards the rear side 86 of the cover 72. The cover 72 also includes an alignment feature 94. In one example, the alignment feature 94 is a hole. In another example, the cover 72 includes two alignment features 94.

The cover 72 is produced using "Rapid Prototyping," eliminating the need of complicated machining. For example, the cover 72 can be made directly from a computer (CAD) model.

Figure 5:
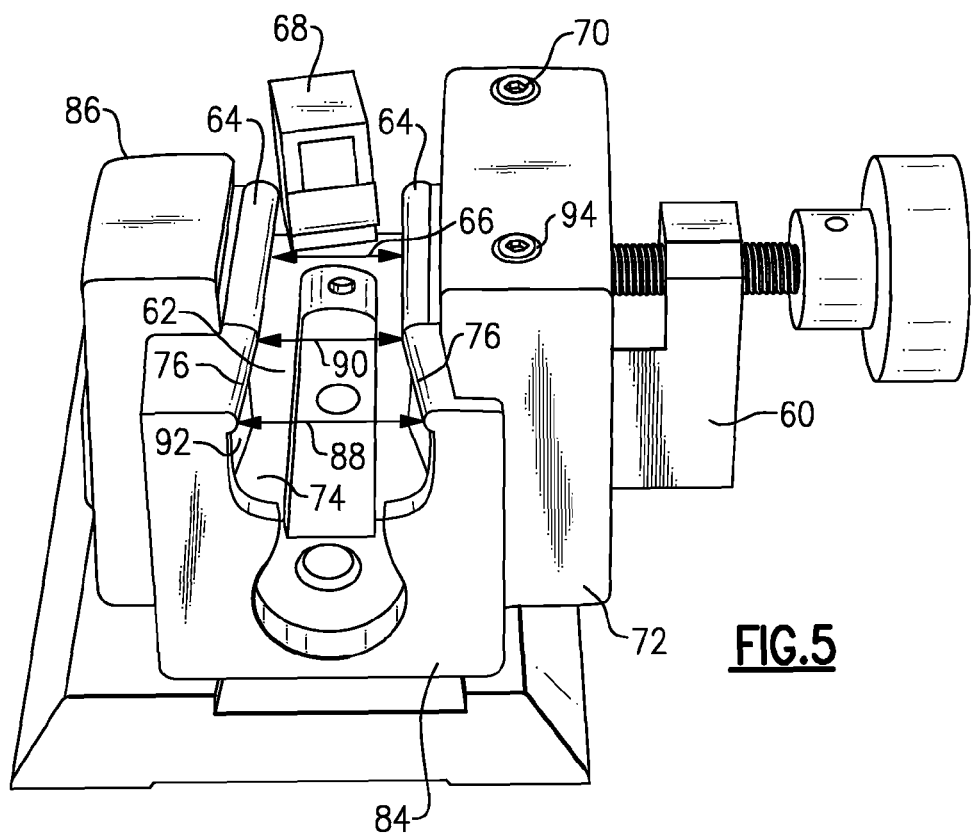
FIG. 5 illustrates the cover positioned on the fixture.
Figure 6:
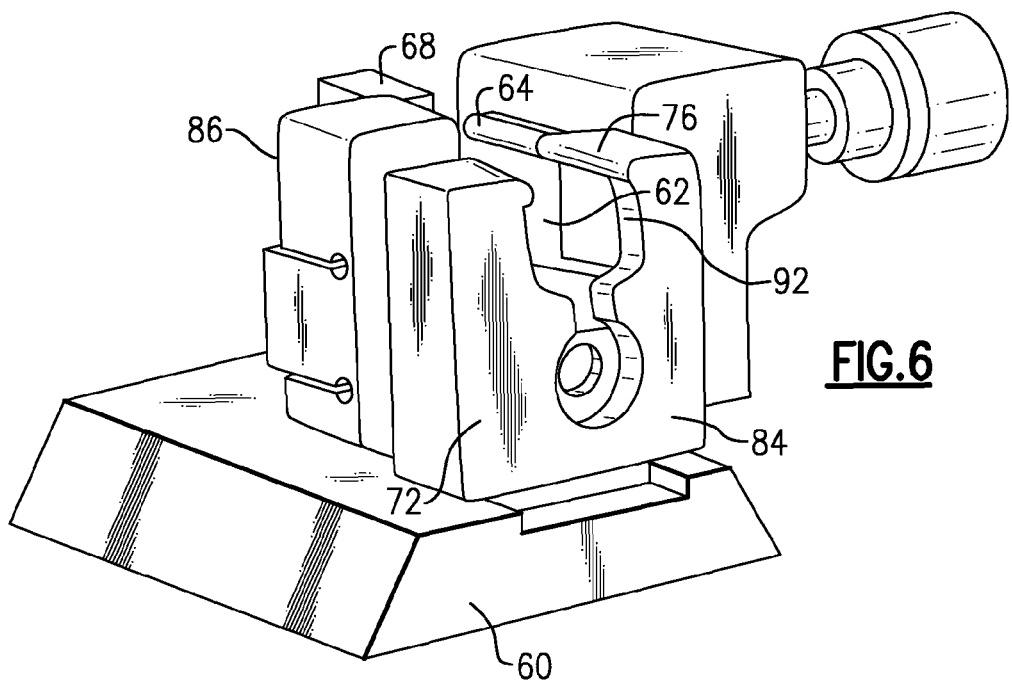
FIG. 6 illustrates a perspective view of the cover positioned on the fixture.

As shown in FIGS. 5 and 6, when the cover 72 is placed on the front portion of the fixture 60, the alignment features 70 of the fixture 60 are aligned with the alignment features 94 of the cover 72, aligning the cover 72 relative to the fixture 60. In one example, the alignment features 70 of the fixture 60 are received in the alignment features 94 of the cover 72. Each projection 76 of the cover 72 generally aligns with one of the projections 64 of the fixture 60. That is, the distance 90 between the projections 76 of the cover 72 is generally equal to the distance 66 between the projections 64 of the fixture 60 at the location where these components meet. The opening 62 of the fixture 60 is exposed and not covered by the cover 72. That is, the opening 74 of the cover 72 does not block access to the opening 62 of the fixture 60.

Figure 7:
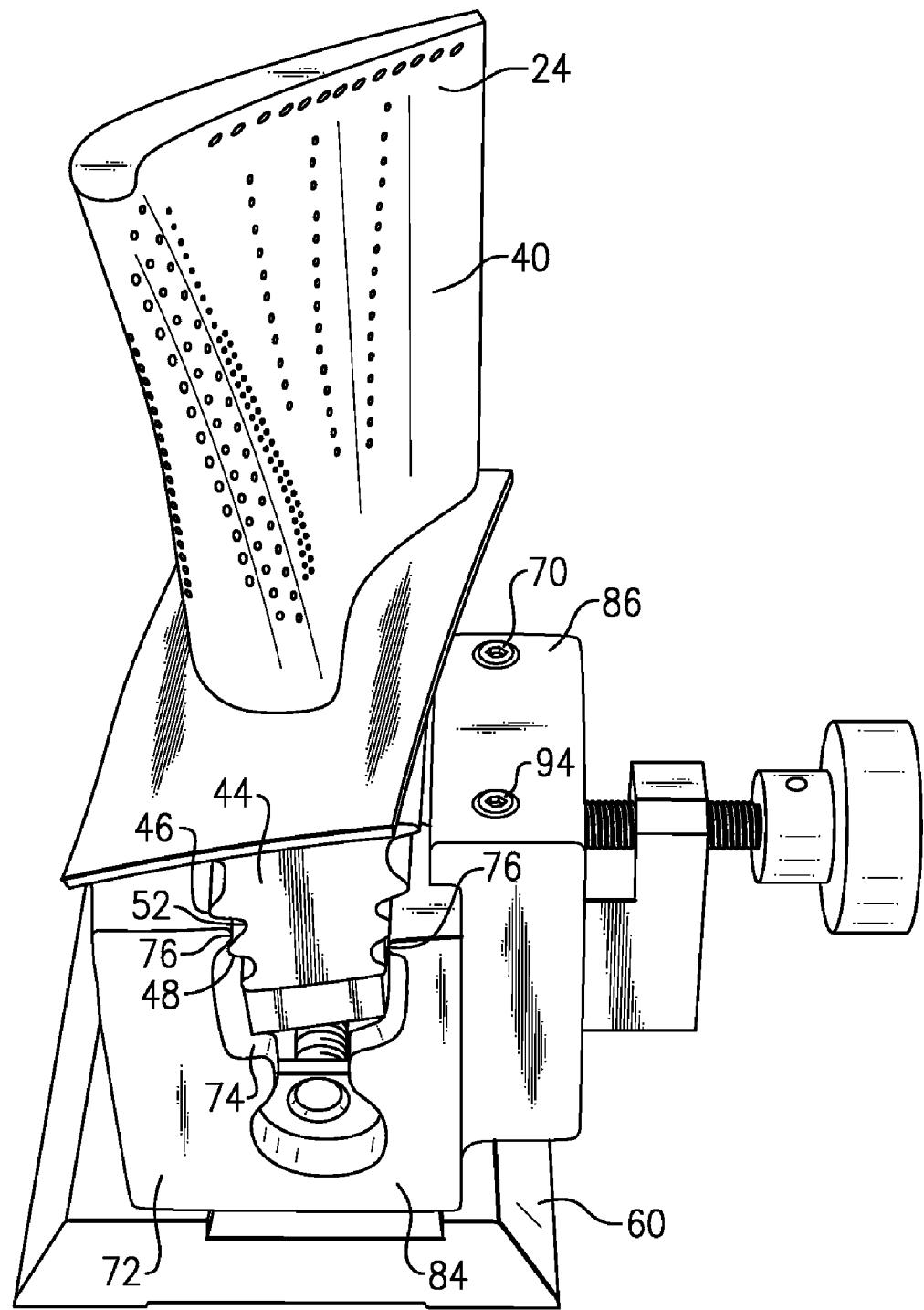
FIG. 7 illustrates the cover positioned on the fixture with the turbine blade installed in the fixture.

FIG. 7 shows an assembly of the base 44 of the turbine blade 24 installed in the fixture 60. When the turbine blade 24 is to be installed in the fixture 60 before a manufacturing process, the base 44 of the turbine blade 24 is aligned with the opening 62 of the fixture 60. The turbine blade 24 is then slid in a rearwardly direction, and the projections 76 of the cover 72 are received in the grooves 52 of the turbine blade 24. The distance 88 of the opening 74 of the cover 72 is greater than the width 56 of the base 44 of the turbine blade 24, minimizing contact between the base 44 and the cover 72 and helping to locate the turbine blade 24 in the fixture 60.

The turbine blade 24 is installed from the front portion of the fixture 60. As the turbine blade 24 is slid rearwardly, a distance between the opening 74 of the cover 72 and the base 44 decreases as the projections 76 taper inwardly. As the turbine blade 24 continues to move rearwardly, the projections 64 of the fixture 60 are received in the grooves 52 of the base 44 of the turbine blade 24. As the distances 66 and 90 are generally equal, the turbine blade 24 smoothly transitions from moving relative to the cover 72 to moving relative to the fixture 60. The stop 68 of the fixture 60 prevents further rearward movement of the turbine blade 24 relative to the fixture 60.

In the above-described example, the fixture 60 and the cover 72 include projections 64 and 76, respectively, that engage grooves 52 of a turbine blade 24. However, the fixture 60 and the cover 72 can include grooves that receive a projection of the turbine blade 24 (formed by one of the hills 46 and 48 as it extends along the length 54 of the base 44 of the turbine blade 24). Alternately, the alignment feature 70 of the fixture 60 can be a hole, and the alignment feature 94 of the cover 72 can be a circular head or any type of alignment feature.

The cover 72 is made of a non-metallic material and facilitates reducing the turbine blade 24 from being scratched or damaged as the turbine blade 24 is installed in the fixture 60. The cover 72 facilitates reducing metal to metal contact between the turbine blade 24 and the fixture 60 that might nick, dent or scratch the turbine blade 24 as the turbine blade 24 is installed in the fixture 60. Because the distance 88 of the opening 74 of the cover 72 is greater than the width 56 of the base 44 of the turbine blade 24, the base 44 is easily inserted into the opening 74 of the cover 72.

After the turbine blade 24 is installed, a manufacturing process is performed. For example, when the manufacturing process is a laser drilling process, the assembly is mounted in a laser machine and the turbine blade 24 is drilled with a drilling machine. During the laser drilling process, laser spatter can form. If the laser spatter accumulates on the cover 72 of the fixture 60, the laser splatter can easily be removed from the non-metallic cover 72. In the event that the cover 72 becomes covered with laser splatter, the cover 72 can be easily replaced with a new cover 72.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. An assembly used in performing a manufacturing process on a turbine engine component, the assembly comprising:
    a fixture including a fixture opening shaped to receive a portion of a turbine engine component; and
    a non-metallic cover positioned over at least a portion of an external surface of the fixture, wherein the non-metallic cover is visible when positioned over the at least a portion of the external surface of the fixture; wherein the fixture has a top surface, a front surface, and a side surface, and the non-metallic cover has a top surface, a front surface, and a side surface, and the top surface, the front surface, and the side surface of the non-metallic cover are positioned over the top surface, the front surface, and the side surface of the fixture, respectively.

2. The assembly as recited in claim 1 wherein the fixture is metal and the non-metallic cover is made of glass filled nylon.

3. The assembly as recited in claim 1 wherein the fixture includes a fixture alignment feature and the non-metallic cover includes a cover alignment feature, and the fixture alignment feature and the cover alignment feature position the non-metallic cover relative to the fixture.

4. The assembly as recited in claim 1 wherein the turbine engine component is a turbine blade.

5. The assembly as recited in claim 1 wherein the turbine engine component includes a base, and the base has a shape corresponding to a shape of the fixture opening.

6. The assembly as recited in claim 1 wherein the fixture includes a fixture projection in the fixture opening and the non-metallic cover includes a cover projection that substantially aligns with the fixture projection when the non-metallic cover is installed on the fixture.

7. The assembly as recited in claim 6 wherein the non-metallic cover is positioned over a front portion of the fixture, and the turbine engine component is installed in the fixture from the front portion such that the turbine engine component is first guided by the cover projection and is then guided by the fixture projection.

8. The assembly as recited in claim 6 wherein turbine engine component includes a base having a groove, and the cover projection is received in the groove as the turbine engine component is installed in the fixture to guide the turbine engine component relative to the cover.

9. The assembly as recited in claim 6 wherein turbine engine component includes a base having a groove, and the fixture projection is received in the groove as the turbine engine component is installed in the fixture to guide the turbine engine component relative to the fixture.

10. The assembly as recited in claim 6 wherein the fixture projection comprises two fixture projections and the cover projection comprises two inwardly tapering cover projections, wherein each of the two fixture projections substantially align with one of the two inwardly tapering cover projections.

11. A cover to protect a turbine engine component installed in a fixture during a manufacturing process performed on the turbine engine component, the cover comprising:
   a non-metallic body positioned over at least a portion of an external surface of a fixture, wherein a turbine engine component is installable in the fixture, and the non-metallic body is visible when positioned over the at least a portion of the external surface of the fixture; wherein the fixture has a top surface, a front surface, and a side surface, and the non-metallic cover has a top surface, a front surface, and a side surface, and the top surface, the front surface, and the side surface of the non-metallic cover are positioned over the top surface, the front surface, and the side surface of the fixture, respectively.

12. The cover as recited in claim 11 wherein the non-metallic body is made of glass filled nylon.

13. The cover as recited in claim 11 including a cover projection that guides the turbine engine component during installation of the turbine engine component in the fixture.

14. The cover as recited in claim 13 wherein the cover projection comprises two inwardly tapering cover projections.

15. The cover as recited in claim 11 including an alignment feature that aligns the cover relative to the fixture.

16. A method of performing a manufacturing process on a turbine engine component, the method comprising the steps of:
   positioning a non-metallic cover over at least a portion of an external surface of a fixture, wherein the non-metallic cover is visible when positioned over the at least a portion of the external surface of the fixture; and
   installing a turbine engine component in a fixture opening of the fixture; wherein the step of positioning the non-metallic cover over the at least a portion of the external surface of the fixture includes positioning the non-metallic cover relative to the fixture such that a top surface, a front surface, and a side surface of the non-metallic cover is positioned over a top surface, a front surface, and a side surface of the fixture, respectively.

17. The method as recited in claim 16 further including the step of performing a manufacturing process on the turbine engine component after the steps of positioning the non-metallic cover over the at least a portion of the external surface of the fixture and installing the turbine engine component in the fixture opening of the fixture.

18. The method as recited in claim 17 wherein the step of performing the manufacturing process includes laser drilling the turbine engine component.

19. The method as recited in claim 16 wherein the step of installing the turbine engine component includes the step of sliding the turbine engine component relative to the fixture, wherein the non-metallic cover first guides the turbine engine component and the fixture then guides the turbine engine component.

20. The assembly as recited in claim 3 wherein the fixture alignment feature is a circular head and the cover alignment feature is a hole that receives the circular head, and the circular head is visible when the non-metallic cover is positioned over the at least a portion of the external surface of the fixture.

21. The assembly as recited in claim 4 wherein the fixture is not a turbine rotor.

22. The assembly as recited in claim 4 wherein the turbine blade is received in the fixture opening of the fixture for manufacturing procedures prior to being received in a slot in a turbine rotor.

23. The method as recited in claim 16 including the step of aligning the non-metallic cover with the fixture by locating an alignment feature of the fixture in a hole of the non-metallic cover, and the alignment feature is visible when the non-metallic cover is positioned over the fixture.

24. The method as recited in claim 17 including the steps of removing the turbine engine component from the fixture opening of the fixture after the step of performing the manufacturing process on the turbine engine component and installing the turbine engine component in a slot in a turbine rotor.

25. The method as recited in claim 24 wherein the turbine engine component is a turbine blade.

* * * * *